United States Patent [19]
Brewer

[11] Patent Number: 5,713,388
[45] Date of Patent: Feb. 3, 1998

[54] GAGE SHROUD

[75] Inventor: Barrie D. Brewer, Salt Lake City, Utah

[73] Assignee: NovaTech, North Salt Lake, Utah

[21] Appl. No.: 701,334

[22] Filed: Aug. 30, 1996

[51] Int. Cl.$^6$ .................................................. F16K 35/10
[52] U.S. Cl. ........................................ 137/377; 137/382
[58] Field of Search ...................................... 137/377, 382

[56] References Cited

U.S. PATENT DOCUMENTS

| | | | |
|---|---|---|---|
| D. 262,269 | 12/1981 | Gorman | D10/94 |
| D. 283,203 | 4/1986 | Gorman | D10/94 |
| 2,946,223 | 7/1960 | Lauer, Jr. | 137/382 |
| 3,958,716 | 5/1976 | Korte | 137/382 |
| 4,352,370 | 10/1982 | Childrese | 137/382 |
| 4,638,666 | 1/1987 | Wong | 73/431 |
| 5,058,758 | 10/1991 | Suddeth | 137/382 |
| 5,238,141 | 8/1993 | Callegari et al. | 137/382 |

FOREIGN PATENT DOCUMENTS

| | | | |
|---|---|---|---|
| 0902574 | 6/1972 | Canada | 240/41.6 |
| 1438753 | 6/1976 | United Kingdom | 73/431 |

*Primary Examiner*—A. Michael Chambers

[57] ABSTRACT

A gauge shroud for protecting a gauge of a first select equivalent outer diameter which is connected to the distal end of a gauge stem extending a first select distance from a body includes a base having a top and a bottom separated by a second select distance slightly less than the first select distance. The base defines a radially inward extending gauge stem receiving slot between the top and bottom. A cap has a side wall having a second select equivalent inner diameter, an open top and an open bottom. The second select equivalent diameter is greater than the first select equivalent diameter. The hinge pivotally connects the cap and the base, whereby the cap can be pivoted relative to the base between a closed position with the open bottom of the cap abutting the base top and an open position of the open bottom inclined from the base. A latch between the cap and the base selectively maintains the cap in the closed position.

9 Claims, 4 Drawing Sheets

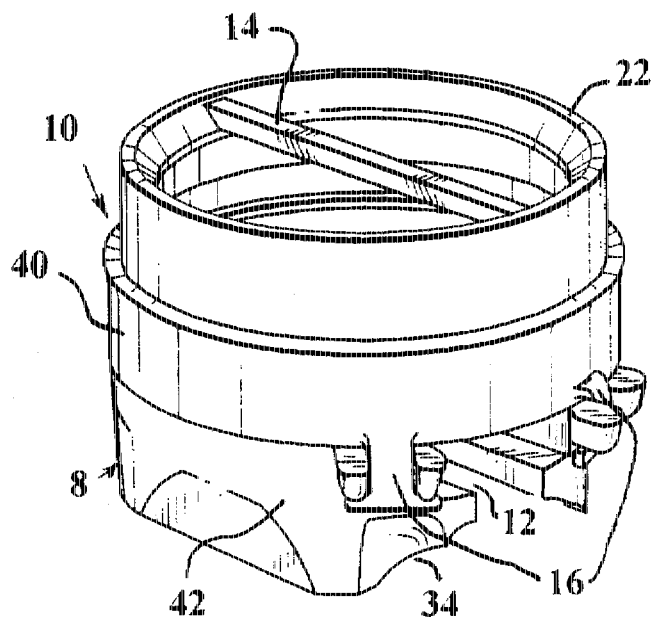
FIG. 1-A
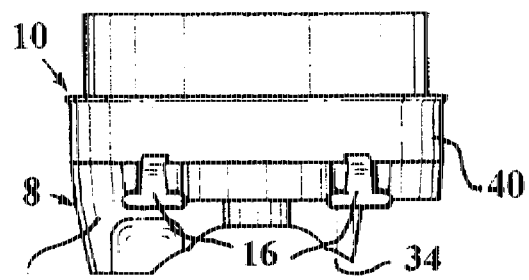
FIG. 2-A
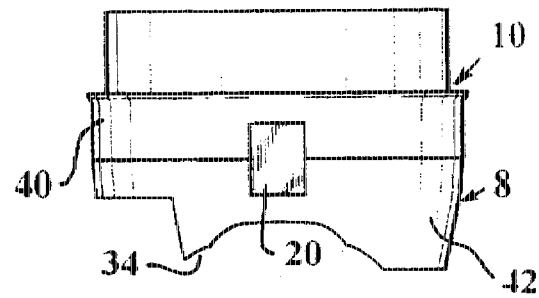
FIG. 3-A

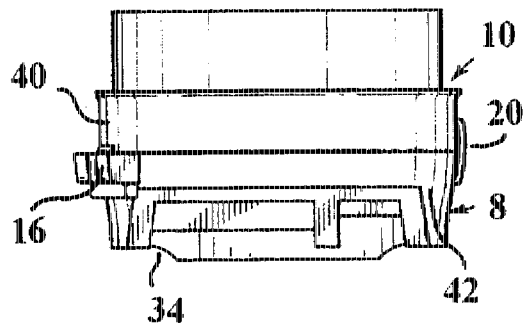
FIG. 4-A
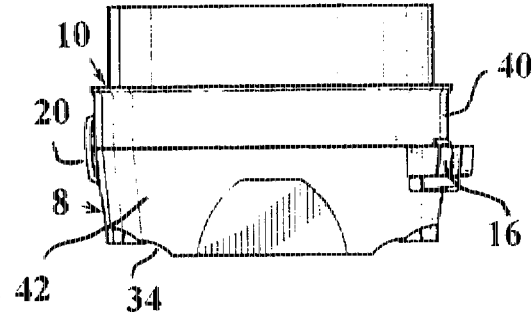
FIG. 5-A
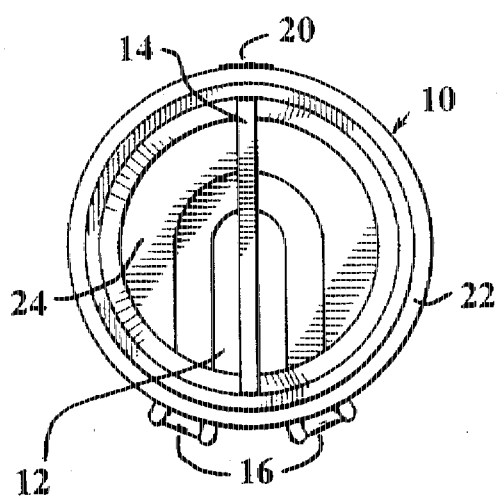
FIG. 6-A
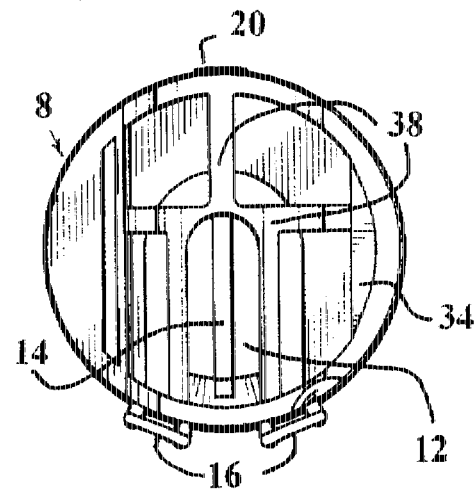
FIG. 7-A

GAGE SHROUD

BACKGROUND—CROSS REFERENCES TO RELATED APPLICATIONS

| | | |
|---|---|---|
| 3,958,716 | 5/1976 | Korte ... 137/382 |
| D262,269 | 12/1981 | Gorman ... D10/94 |
| D283,203 | 4/1986 | Gorman ... D10/94 |

1. Field of Invention

This invention relates to protective enclosures for gauges, particularly gauges which measure gas, fluid, or air pressure.

2. Description of Prior Art

Pressure gauges have been incorporated in valve and regulator assemblies to indicate the incremental change in fluid, gas, or air pressure. Many types of pressure gauges extend radially from valves, and are subject to accidental collision or impact with solid objects.

As is known, several protective covering devices have been invented for use with pressure gauges. The most common of these devices consists of metallic structures and fastening hardware. Some of these prior art devices are fashioned from thin wall malleable metals. When exposed to frequent and intense impact, these prior art gauge protectors are subject to deformation, which in-turn causes damage to the enclosed pressure gauge.

Installation of some prior art gauge protectors require hand tools and manual dexterity. The design embodied in prior art gauge protectors limit the use of these devices to specific gauge sizes and configurations. Another significant draw back to prior art is the bulky structural design which obscures a clear view of the gauge dial. Heretofore protective enclosures for pressure gauges have certain design limitations, some of which are:

(a) Limited durability and structural integrity
(b) Complicated, labor-intensive installation
(c) Limited compatibility relative to gauge size and configuration
(d) Bulky designs obstruct view of gauge dial

OBJECTS AND ADVANTAGES

It is the primary purpose of the subject invention (gage shroud) to protect pressure gauges from damage which may result from collision or impact with solid objects. The foregoing is achieved through the design of a cylindrical shaped enclosure comprised of a base and cap which substantially encapsulates a pressure gauge, while allowing clear visibility of the gauge dial.

Accordingly the objects and advantages of the gage shroud are:

(a) to provide protection for pressure gauges and maintain structural integrity even under the most extreme conditions of impact and vibration. This advantage is achieved through molding the gage shroud from resilient synthetic materials.
(b) to provide a protective enclosure for pressure gauges which is simple and convenient to install. The gage shroud two piece design facilitates simple and rapid installation without the use of tools.
(c) to provide an enclosure for pressure gauges that is compatible with multiple gauge sizes and configurations. Both design and material lend to the versatility and adaptability of the gage shroud.
(d) to provide a protective enclosure for pressure gauges which incorporates a clear unobstructed view of the gauge dial.

In addition to the preceding objects and advantages, the aesthetic qualities of the gage shroud include: lightweight, low profile, and precision crafting.

DRAWING FIGURES

Some drawings have closely related figures with the same numbers but different alphabetic suffixes.

FIG. 1A is a perspective view of an alternate embodiment of the gage shroud.

FIG. 2A shows a front view of a gage shroud with locking means, cap side wall, base side wall, and bottom contour in plain view.

FIG. 3A shows a rear view of a gage shroud with a living hinge, cap side wall, base side wall, and bottom contour clearly shown.

FIG. 4A shows a right side view of a gage shroud with a perspective side view of a cap side wall, base side wall, and exposed side views of a living hinge, and a locking means.

FIG. 5A is a left side view of a gage shroud which shows a cap side wall, base side wall, and exposed views of a living hinge, bottom contour, and locking means.

Figure 1:
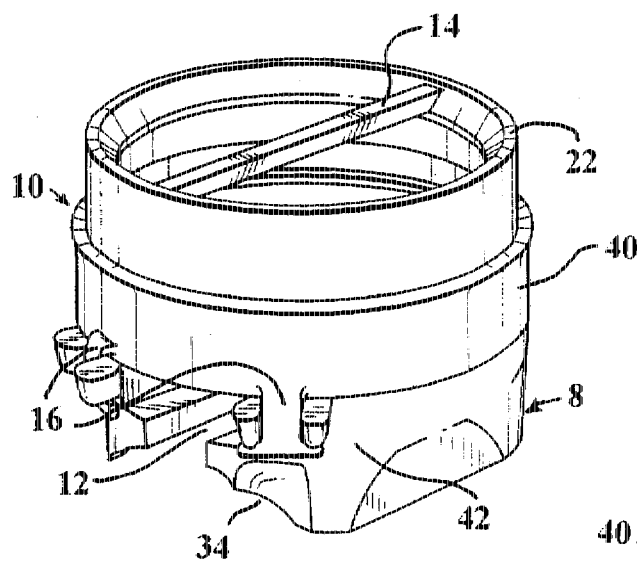
FIG. 1 is a perspective view of one preferred embodiment of a gage shroud.

FIG. 6A shows a top view of a gage shroud with details of a rim, cross bar, and locking means; and includes a view of a platform, and slot through the cylindrical opening of a cap FIG. 7A shows a bottom view of a gage shroud with a living hinge and locking means on the perimeter, and interior details of a honeycomb structure made up of rib supports and a base side wall, with a bottom view of a cross bar through a slot opening.

Reference Numeral in Drawings 8 base
10 cap
12 slot
14 cross bar
16 tab
18 notch
20 hinge
22 rim
24 platform
26 ridge
28 valve body
30 gauge
32 gauge stem
34 bottom contour
36 lip
38 rib supports
40 cap side wall
42 base side wall

DETAILED DESCRIPTION OF FIGS. 1 TO 7A

A typical embodiment of a gage shroud of the subject invention is illustrated in FIG. 1. The gage shroud consists of two main components, namely a base 8, and a cap 10, which cooperate together to form a protective enclosure for a gauge 32.

Base 8 is a hollow horseshoe shaped object with a distinct top and bottom orientation. The top of base 8 is formed by a platform 24, which is integral to base side wall 42, and is also integral on the inside to rib supports 38. The inside of base 8 is a honeycomb construction with a plurality of rib supports 38 which are integral to base side wall 42 and platform 24. The top outside edge of platform 24 is recessed to form ridge 26.

The bottom of base 8 is made up of exposed rib supports 38 and base side wall 42 which are opposite of platform 24. The open end of rib supports 38 and integral base side wall 42 is concave in shape and is referred to as bottom contour 34.

An elongated "u" shaped slot 12 projects out from the center of base 8 on a horizontal axis. The interior walls of slot 12 project down at right angles from platform 24 and are integral to bottom contour 34.

Cap 10 is a hollow cylindrical shaped object and includes a substantially cylindrical cap side wall 40. At the top of cap 10 is a rim 22 which forms an integral top edge and extends around the entire circumference of cap 10. A crossbar 14 extends transverse across the open center of the top radius of cap 10 and is integral to rim 22.

Ridge 26 is designed to mate with lip 36 when cap 10 is placed directly on top of base 8. Cap 10 is secured on top of base 8 by a fastening tab 16 and notch 18 which cooperate together like a tongue and groove locking system. In the fully locked position shown in FIG. 4 the gauge 30 is substantially enclosed within the gage shroud.

Operation FIGS. 2 to 7

In a further embodiment, the hollow cylindrical opening of cap 10 will have a defined inside diameter slightly greater than the outside diameter of gauge 30. The bottom contour 34 of base 8 is shaped to conform to the outside surface of valve body 28 at the point where gauge stem 32 connects to valve body 28.

Figure 2:
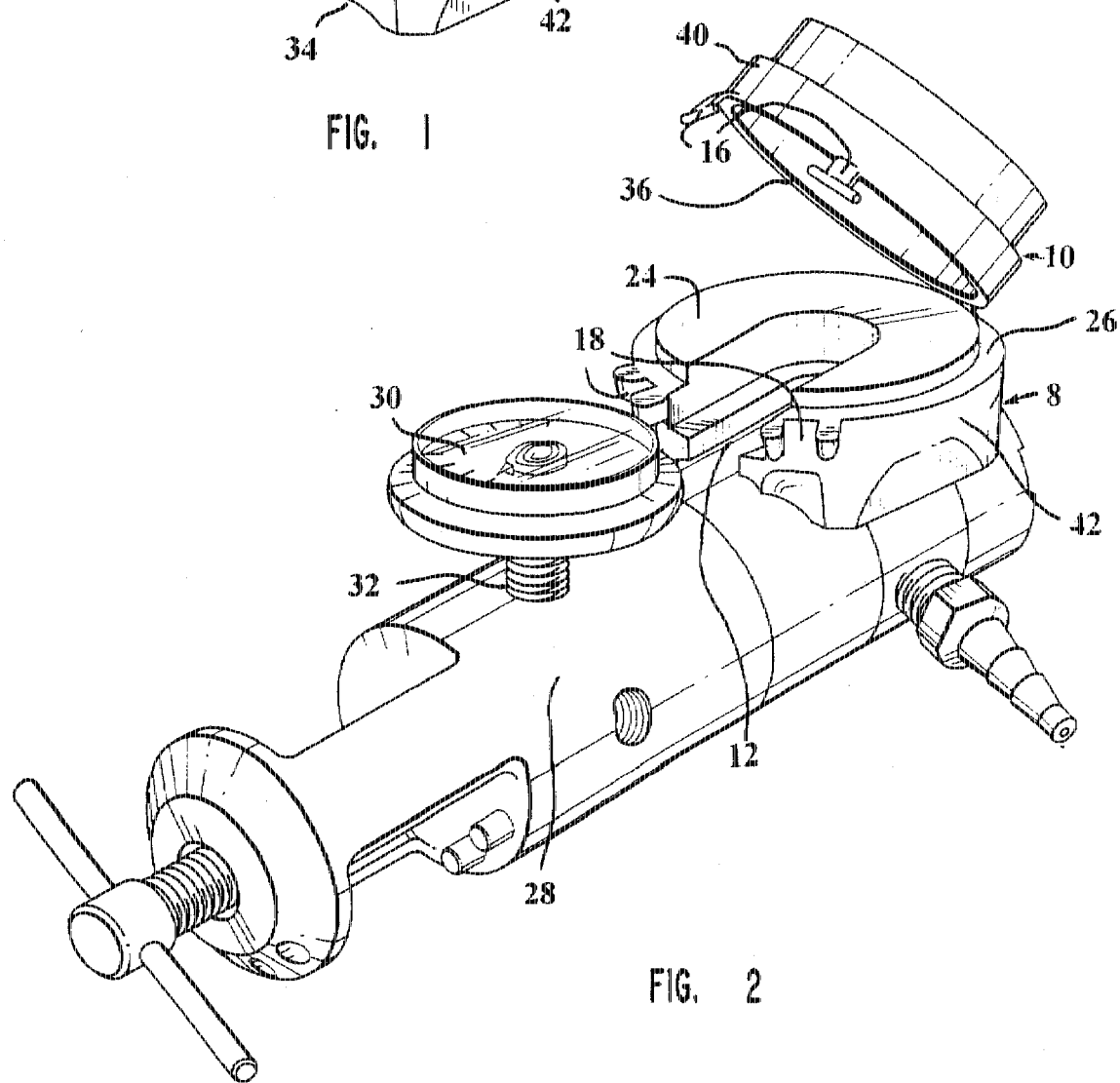
FIG. 2 is a perspective view showing the first step in the installation process of a gage shroud on a pressure gauge and valve assembly.
Figure 3:
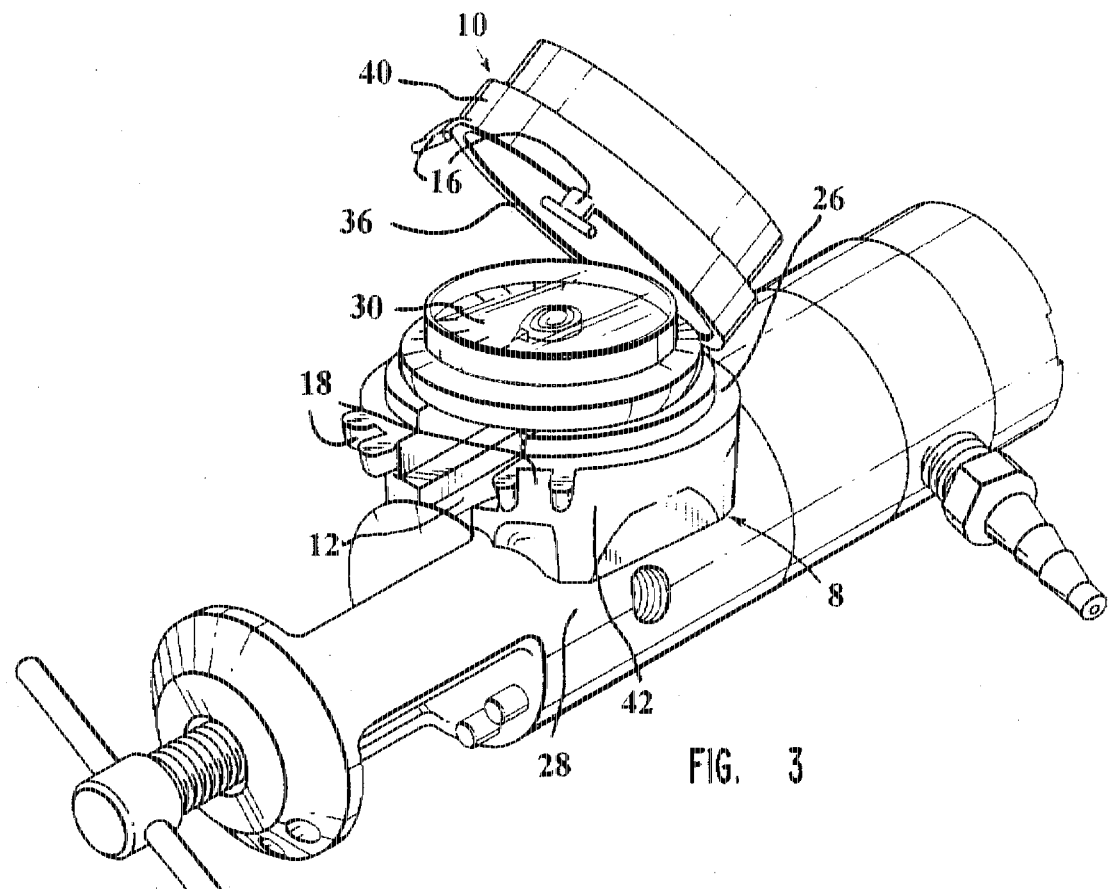
FIG. 3 is a perspective view of the second step in the installation of a gage shroud on a pressure gauge and valve assembly.
Figure 4:
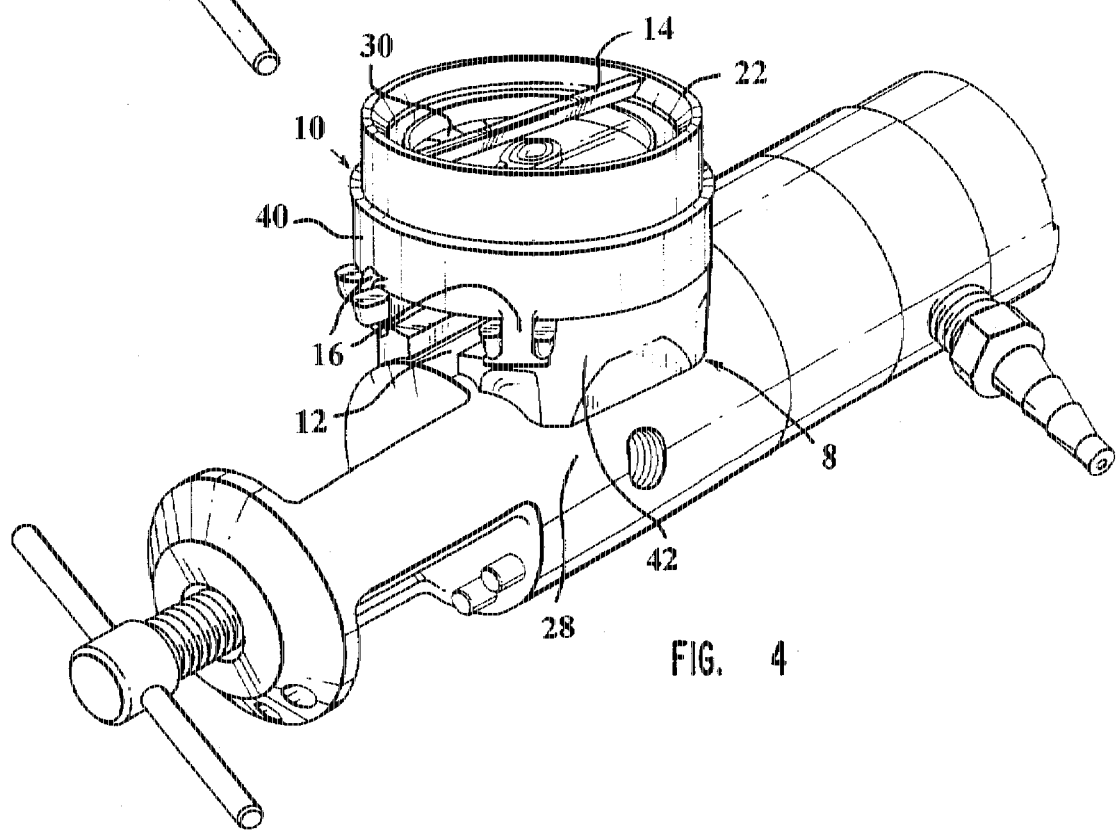
FIG. 4 is a perspective view of the final step in the installation of a gage shroud on a pressure gauge and valve assembly.

Installation of the gauge shroud as shown in FIG. 1 is clearly shown in FIGS. 2 through 4. FIG. 2 shows the simple procedure of aligning the opening of slot 12 in a direct line with gauge stem 32. The bottom contour 34 of base 8 rests solidly on valve body 28 during this alignment maneuver.

Platform 24 of base 8 is pushed underneath the bottom of gauge 30, while slot 12 engages gauge stem 32. Gauge 30 comes to rest top dead center of platform 24 as depicted in FIG. 3.

Cap 10 is placed on top of base 8 and lip 36 mates with ridge 26 to form a complete fully integrated enclosure around gauge 30. Tab 16 is snapped in to notch 18 to secure cap 10 to base 8 as shown in FIG. 4.

When the gage shroud of FIG. 1 is properly installed, it provides substantial protection to gauge 30. The gage shroud design transfers the shock from the point of impact anywhere on the gage shroud down to the point where base 8 makes contact with valve body 28.

A clear view of the dial or measuring mechanism of gauge 30 is provided through the two half moon shaped openings at the top of cap 10. Crossbar 14 provides additional protection against objects penetrating inside the top of cap 10.

Summary, Ramifications, and Scope

The subject invention, gage shroud, is comprised of a combination cap and base which are substantially hollow and cylindrical by design. Pressure gauges enclosed within the confines of the combination cap and base are protected against impact damage. The gage shroud encloses the entire gauge including the case and internal components. The gage shroud should not be confused with the gauge case or other support structures of the operating elements inside the gauge.

In the preferred embodiment the dimensions of the gage shroud vary from 30 mm to 100 mm in diameter and 30 mm to 70 mm in depth. The wall thickness of both base 8 and cap 10 is approximately 2 mm. The shape and dimensions of bottom contour 34 will vary according to the size of gauge 30 and its orientation to valve body 28.

Suitable construction materials for the gage shroud include high density polyethylene's, polypropylene's, polyurethane's, and other desirable, deformable plastics which are durable and hold their original configuration.

Moreover, the gage shroud does not require tools for installation. The gage shroud design is compatible with a variety of gauge sizes and configurations. Unlike prior art inventions, the gage shroud effectively transfers damaging shock vibrations away from the gauge while maintaining its structural integrity. The low profile design of the gage shroud facilitates clear visibility of the needle indicator or digital display of a pressure gauge.

Although the preceding description contains many specifications, these should not be construed as limiting the scope of the gage shroud invention, but as merely providing illustrations of some of the presently preferred embodiments of the invention. A variation of the gage shroud invention provides for a cap and base which are not attached, but are distinctly separate components which can be fastened together via a locking means. The locking means described in the preferred embodiment is a tab and notch fastening system; however, the means for fastening the cap and base together may take on any of a variety of forms.

Obviously numerous modifications and variations of the subject invention are possible in light of the above teachings. Thus the scope of the subject invention gage shroud should be determined by the appended claims and their legal equivalents, and not according to the examples given.

I claim:

1. A gauge shroud for protecting a gauge of a first select equivalent outer diameter which is connected to the distal end of a gauge stem extending a first select distance from a body, the gauge shroud comprising:
    a base having a top and a bottom separated a second select distance, the base defining a radially inward extending gauge stem receiving slot between the top and bottom;
    a cap comprising a side wall having a second select equivalent inner diameter, an open top and an open bottom, the second select equivalent diameter being greater than the first select equivalent diameter;
    a hinge pivotally connecting the cap and the base, whereby the cap can be pivoted relative to the base between a closed position with the open bottom of the cap abutting the base top and a open position with the open bottom inclined from the base; and
    a latch between the cap and the base for selectively maintaining the cap in the closed position.

2. The gauge shroud of claim 1 made from a resilient polymer.

3. The gauge shroud of claim 1 wherein the hinge is a living hinge.

4. The gauge shroud of claim 1 wherein the base, cap hinge and latch are integrally formed from a single piece of a resilient polymer.

5. The gauge shroud of claim 1 wherein the bottom of the base has a contour matingly corresponding to a contour of the body.

6. The gauge shroud of claim 5 wherein the cap has a cylindrical side wall.

7. The gauge shroud of claim 1 further comprising an integral support extending between discreet points on the side wall of the cap across the open top.

8. The gauge shroud of claim 1 wherein the latch comprises:

an integral tab extending from a bottom edge of the cap side wall; and a notch defined between a pair of integral posts extending radially from the top of the base, the tab and posts being positioned so that with the cap in the closed position the, the latch is engaged by inserting the tab in the notch with the tab embracing the posts.

9. The gauge shroud of claim 1 wherein the second select distance is only slightly less than the first select distance.

* * * * *